UNITED STATES PATENT OFFICE.

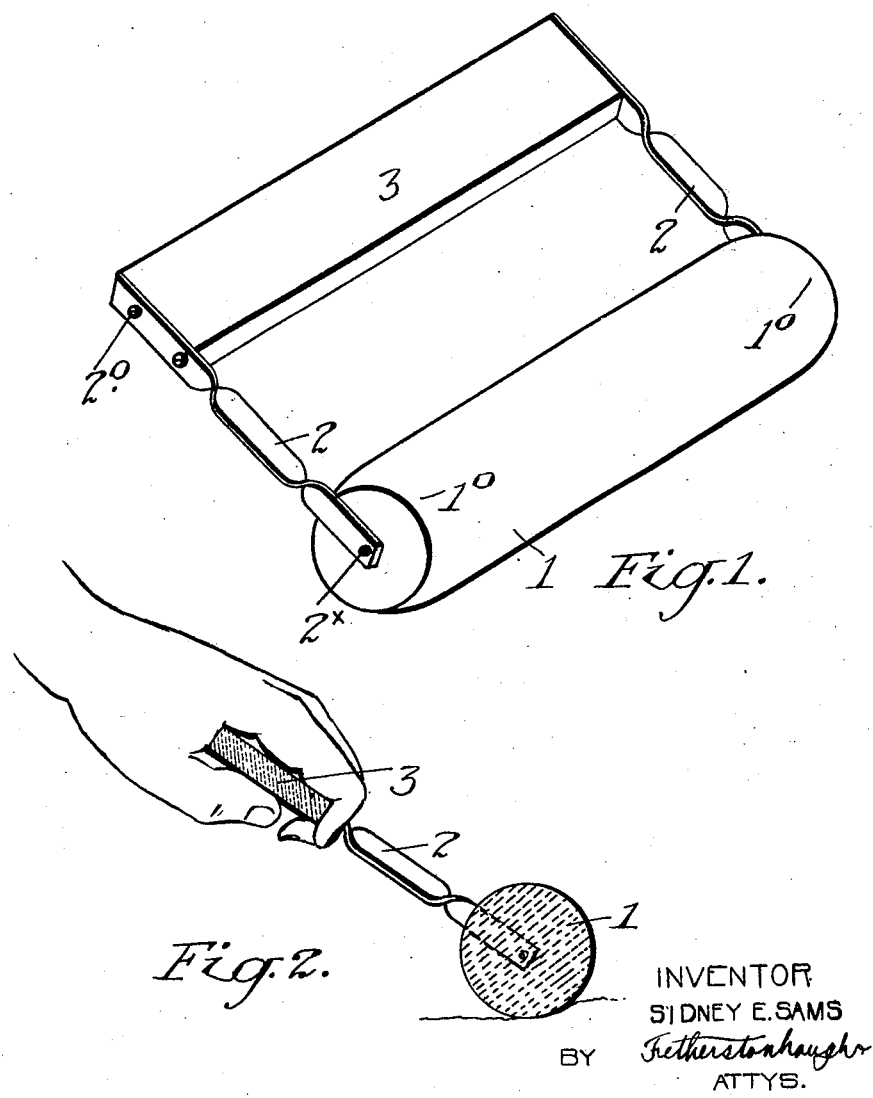

SIDNEY EDWARD SAMS, OF TORONTO, ONTARIO, CANADA.

PASTRY-ROLLER.

1,323,410.  Specification of Letters Patent.  Patented Dec. 2, 1919.

Application filed April 15, 1919. Serial No. 290,158.

*To all whom it may concern:*

Be it known that I, SIDNEY EDWARD SAMS, of the city of Toronto, in the county of York, in the Province of Ontario, Canada, have invented certain new and useful Improvements in Pastry-Rollers, of which the following is the specification.

My invention relates to improvements in pastry rollers and the object of the invention is to so construct the roller that full advantage may be taken of the wrist action during the operation of rolling out the pastry whereby a soft, yet firm pressure is exerted upon the dough to gradually and more evenly roll it out and thereby produce a lighter pastry and it consists essentially of the following arrangement and construction of parts as hereinafter more particularly explained.

Figure 1, is a perspective view of my roller.

Fig. 2, is a sectional view showing the hand applied thereto showing its operation.

In the drawings like characters of reference indicate corresponding parts in the various figures.

1 indicates a roller which is preferably slightly tapered toward its inner ends at 1°. 2 indicates arms which are pivotally connected by pins 2× to the ends of the roller, such arms being preferably formed of spring metal. 3 indicates a flat bar handle, the broad faces of which are presented upwardly and downwardly, the ends of the bar being secured to the arms 2 by screws or other suitable means 2°.

In operation the flat bar handle 3 is grasped by the hand, the arms 2 being held at a slight incline. As the roller is pushed over the pastry to roll it out the wrist of the hand has a free movement which not only enables the roller to cover a greater extent of pastry in its back and forth movement but prevents a heavy pressure being exerted on the pastry, which would have a tendency to compress it too rapidly and would not result in the production of light pastry. The trouble has been that inexperienced persons in using a roller directly operated by the hands at the ends thereof press too heavily thereon. By my construction this heavy pressure is absolutely prevented, a light pressure only being possible which gradually rolls out the pastry to the required thickness.

What I claim as my invention is.

1. The combination with a pastry roller, of arms swingably mounted at each end of the roller, and a flat bar-like handle connecting the outer ends of the arms together.

2. The combination with a pastry roller, of resilient arms swingably mounted at each end of the roller, and a flat bar-like handle connecting the outer ends of the arms together.

SIDNEY EDWARD SAMS.

Witnesses:
 M. EGAN,
 H. HEBDEN.